J. MURPHY & J. BECHTEL.
GAS GATE HOOD CLAMP.
APPLICATION FILED MAY 29, 1917.
1,242,023.
Patented Oct. 2, 1917.
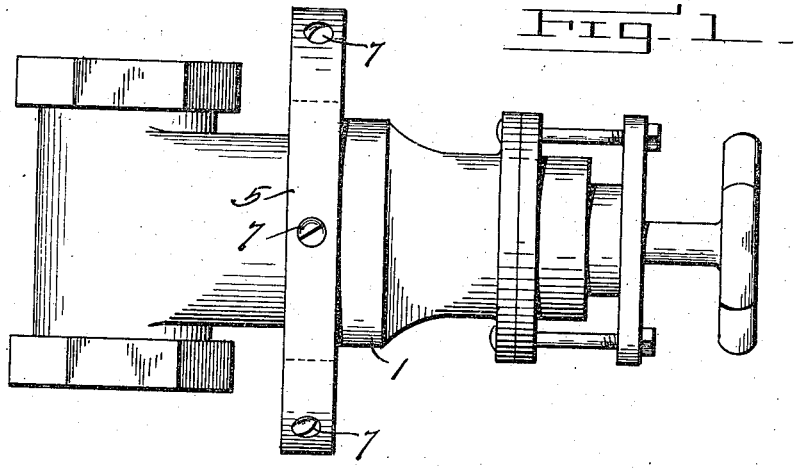
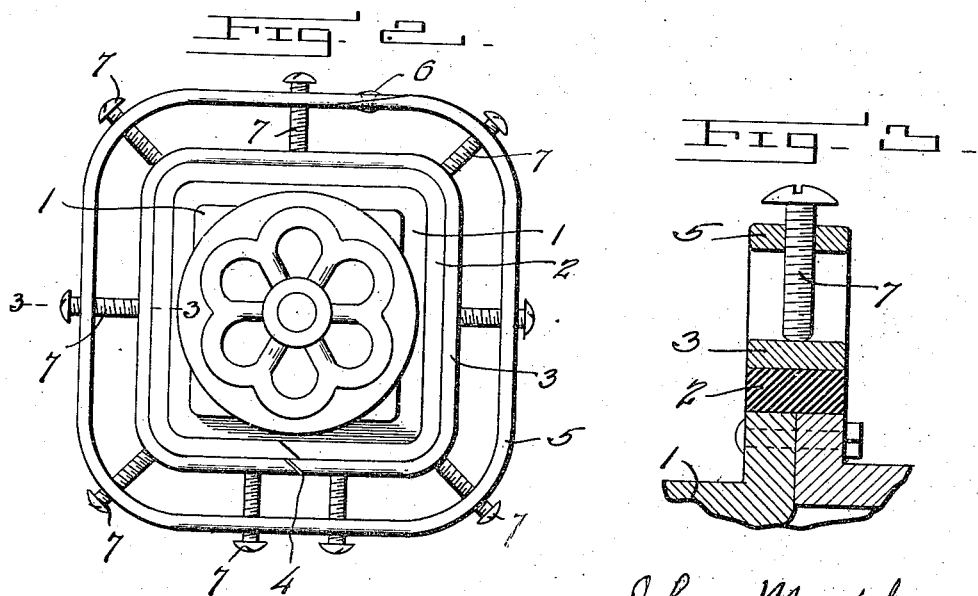
WITNESSES
INVENTORS
John Murphy
Joseph Bechtel
BY Jerry A. Mathews
ATTORNEY

UNITED STATES PATENT OFFICE.

JOHN MURPHY AND JOSEPH BECHTEL, OF ASHLAND, OHIO.

GAS-GATE-HOOD CLAMP.

1,242,023.  Specification of Letters Patent.  Patented Oct. 2, 1917.

Application filed May 29, 1917. Serial No. 171,691.

*To all whom it may concern:*

Be it known that we, JOHN MURPHY and JOSEPH BECHTEL, citizens of the United States, residing at Ashland, in the county of Ashland and State of Ohio, have invented a new and useful Gas-Gate-Hood Clamp, of which the following is a specification.

The object of our invention is to provide a novel clamp to stop a leak in the hood of a gas gate. Gas gates have a gasket in their hoods which becomes worn out in a short time and is likely to cause a leak. To stop this leak it is necessary that pressure be applied equally around the pipe, and it is our object to provide a novel device for effectively and equally applying pressure about the rubber gasket covering the leak.

We attain the object of our invention by the mechanism illustrated in the accompanying drawings in which Figure 1 is a side view of the clamp; Fig. 2 is a plan of the clamp, and Fig. 3 is a detailed section on line 3— Fig. 2.

Like numerals designate like parts throughout the several views.

Referring to the accompanying drawings, 1 designates the gas gate. In our apparatus is a suitable gasket 2, formed from a single strip of rubber encircling member 1; a metal band 3, encircling the gasket 1, having slightly spaced ends 4, to permit of a clamping effect when pressure is applied to it. Spaced apart from band 3 is a second band 5, the ends of which are secured together with a suitable rivet 6. The outer band 5 is operatively connected with inner band 3 by suitable screws or threaded bolts 7 radially disposed about the band, and adapted to exert pressure from all sides upon the inner band 3, to press the gasket 2 tightly over member 1. Thereby any leak in the gas gate 1 is effectually closed. The screws 7 are of any suitable length according to the size of the gates or pipes to which the device is to be applied. In the event of a leak in a gate not fitted with our device the gas line or oil well would have to be released by shutting the nearest gates in either direction while the gate was being repaired, and this would involve serious loss of time and gas.

Clamps heretofore designed have not proven effective because the pressure has not been equally applied around the pipe where the leak has occurred.

What we claim is:

A clamp for the purpose described, consisting of a gasket, a compressible band engaging over the gasket, a second band larger than and spaced apart from the inner band, and a plurality of pressure-exerting members having a threaded engagement with the outer band and positioned to bear against the inner band, whereby pressure may be exerted equally over the gasket.

JOHN MURPHY.
JOSEPH BECHTEL.

Copies of this patent may be obtained for five cents each, by addressing the "Commissioner of Patents, Washington, D. C."